United States Patent
Bangel et al.

(10) Patent No.: US 7,694,275 B2
(45) Date of Patent: Apr. 6, 2010

(54) SYSTEM AND METHOD FOR CONTROLLING THE SCOPE OF SCRIPT LIBRARY CODE

(75) Inventors: Matthew J. Bangel, Poughkeepsie, NY (US); James A. Martin, Jr., Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 11/258,659

(22) Filed: Oct. 26, 2005

(65) Prior Publication Data

US 2007/0094640 A1    Apr. 26, 2007

(51) Int. Cl.
*G06F 9/44*    (2006.01)
(52) U.S. Cl. ....................................... 717/115; 717/114
(58) Field of Classification Search ................. 717/115, 717/114
See application file for complete search history.

(56) References Cited

U.S. PATENT DOCUMENTS 5,764,974 A * 6/1998 Walster et al. ................. 707/6

* cited by examiner

*Primary Examiner*—Wei Y Zhen
*Assistant Examiner*—Lanny Ung
(74) *Attorney, Agent, or Firm*—John R. Pivnichny; Law Office of Jim Boice

(57) ABSTRACT

A script library includes a plurality of common blocks of code including code fragments defined by IF/THEN statements. Packages of parameters forming a data type including a scope parameter are provided in agents which, responsive to being triggered by schedule or menu, issue calls including said scope parameter to functions and procedures said script library. Code fragments bounded by IF/THEN statements within each called function and procedure execute responsive to the scope parameters to operate on entries in a database responsive to other parameters included within the data type.

19 Claims, 3 Drawing Sheets

```
┌─────────────────────────────────────────────────────────┐
│ DECLARATIONS                                            │
├─────────────────────────────────────────────────────────┤
│ X1 RECORD. MODE = "Y1"                                  │
├─────────────────────────────────────────────────────────┤
│ X1 RECORD. VIEW = "Y2"                                  │
├─────────────────────────────────────────────────────────┤
│ X1 RECORD. COST = "Y3"                                  │
├─────────────────────────────────────────────────────────┤
│ . . .                                                   │
├─────────────────────────────────────────────────────────┤
│ SET DOCM1 = M1WORK.GetFirstDocument                     │
├─────────────────────────────────────────────────────────┤
│ WHILE NOT (DOCM1 IS NOTHING)                            │
├─────────────────────────────────────────────────────────┤
│ SET N1 TEMP DOC = M1WORK.GetNextDocument (DOCM1)        │
├──────────────────────┬──────────────────────────────────┤
│ CALL Update All Info │ (DBX1, DBX2, DOCM1, X1RECORD,    │
│                      │  VCOSTS, VDATES)                 │
├──────────────────────┴──────────────────────────────────┤
│ SET DOCM1 = N1TEMPDOC                                   │
├─────────────────────────────────────────────────────────┤
│ END WHILE                                               │
├─────────────────────────────────────────────────────────┤
│ . . .                                                   │
└─────────────────────────────────────────────────────────┘
```

FIG. 3

SYSTEM AND METHOD FOR CONTROLLING THE SCOPE OF SCRIPT LIBRARY CODE

BACKGROUND OF THE INVENTION

1. Technical Field of the Invention

This invention relates to computer applications. More particularly, it relates to controlling the scope of script library code when invoked by variously scheduled agents.

2. Background Art

Many situations exist where substantial code in a script library is shared by many scheduled agents, all running under various schedules including, for example, daily, nightly, weekly, monthly, Mon-Fri only. The code in each agent remains the same, and each time it is called, it all runs.

However, not all the code in a script library function needs to run for all calling agents and the scope of what should/should not run can vary over the life of an application and its agents.

SUMMARY OF THE INVENTION

A system, method, and computer program product for controlling the scope of code in a script library. The script library includes a plurality of common blocks of code including code fragments defined by IF/THEN statements. The code fragments are executed responsive to scope parameters packaged in a collection of parameters forming a datatype and passed to the script library in a call from a database agent triggered by schedule or menu.

Other features and advantages of this invention will become apparent from the following detailed description of the presently preferred embodiment of the invention, taken in conjunction with the accompanying drawings.

BRIEF DESCRIPTION OF THE DRAWINGS

FIG. 3 is a table illustrating an agent 119 with primary database application 110 of FIG. 1.

DETAILED DESCRIPTION OF PREFERRED EMBODIMENTS

In accordance with a preferred embodiment of the present invention, a dynamic schedule of code execution is created using common blocks of code. These blocks are put inside a script library, and are triggered for execution by several parameters. These parameters are packaged together in collections of parameters that form their own data type specifying, among other parameters, schedule (also referred to as scope) referenced by code fragments defined by IF/THEN statements.

Figure 1:
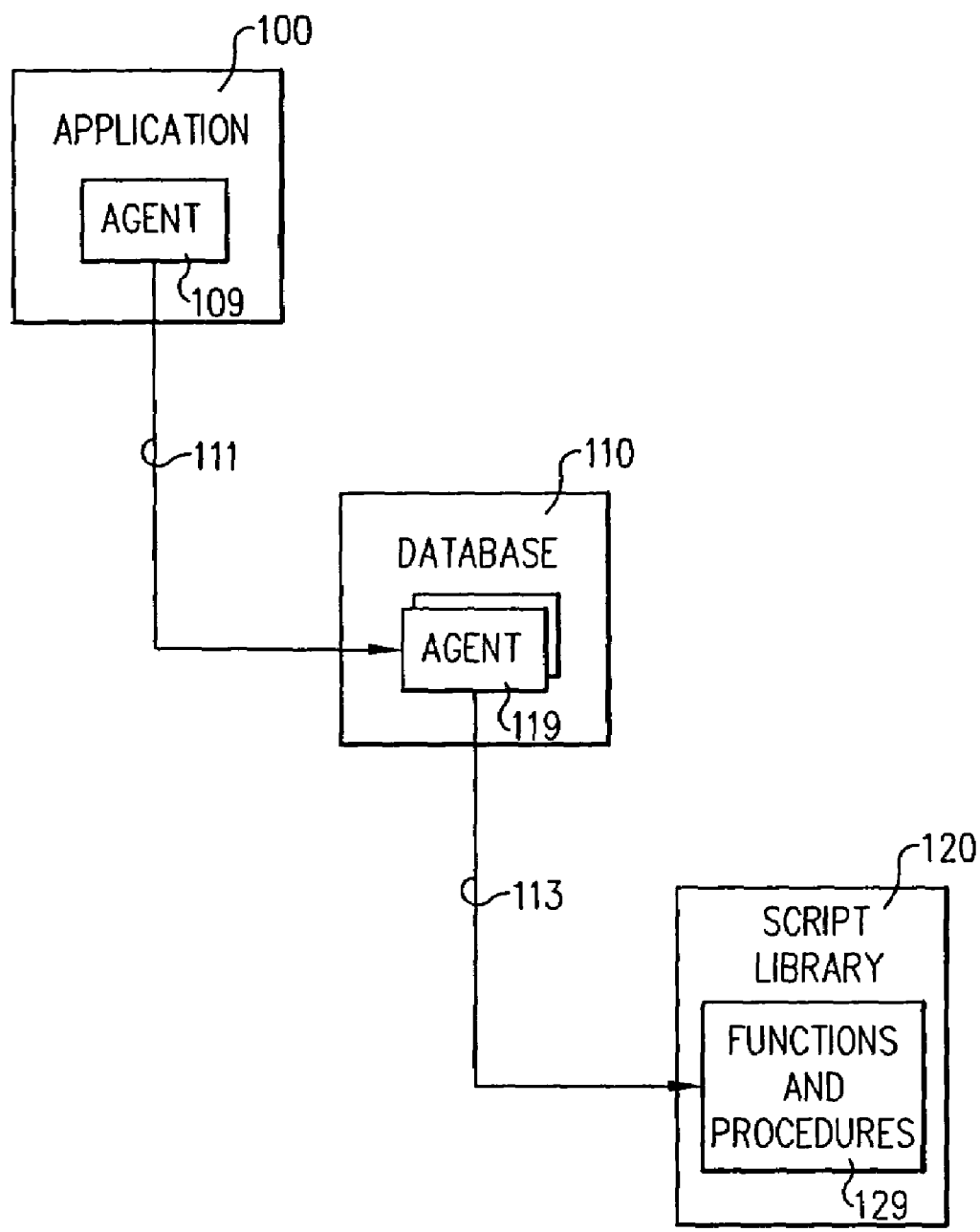
FIG. 1 is a diagrammatic illustration of a system in accordance with the preferred embodiment of the invention for controlling the scope of script library code.

Referring to FIG. 1, in accordance with a preferred embodiment of the invention, application 100 includes several agents 109. According to schedule or on demand (triggered by clock or by menu, respectively) these agents 109 issue calls to one or more agents 119 within database 110, as is represented by line 111. For purpose of this embodiment, agents 109 do not need to pass parameters on 111. Application 100 is a secondary application supporting a primary application (not shown), and schedules agents 109 to choose when agents 119 run. Application 100 is run by a background administrator.

Database 110 includes a plurality of agents 119 which, responsive to call 111 from agent 109 issue calls represented by line 113 to script library 120, generating and passing in these calls scope based parameters which are used to define which functions and procedures 129 are executed. A separate agent 119 is provided for each type of run, such as weekly, monthly, nightly, adhoc. Functions and procedures 129 receive these scope based parameters, as will be described hereafter in connection with FIG. 3. Database 110 is a primary application comprising a plurality of agents 119 which end-users provide and control.

If/then/else subroutines within functions and procedures 129 are dynamically altered based on time and frequency (that is, scope) input parameters 113.

For example, an agent 119, including a call "Update All Client Information", uses all the code in the script library 120. Other agents use various portions of code in the script library 120. Using one common code base in script library 120, parameters 113 are passed to functions 129 within the script library. Within script library 120 are condition statements surrounding logical blocks of code 129. These condition statements check these parameters to see if the upcoming block of code 129 should be executed or bypassed.

In this manner, it is possible to provide a single instantiation of common code, such as script libraries 120, subroutine calls, and so forth, rather than duplicating code in various places.

Figure 2:
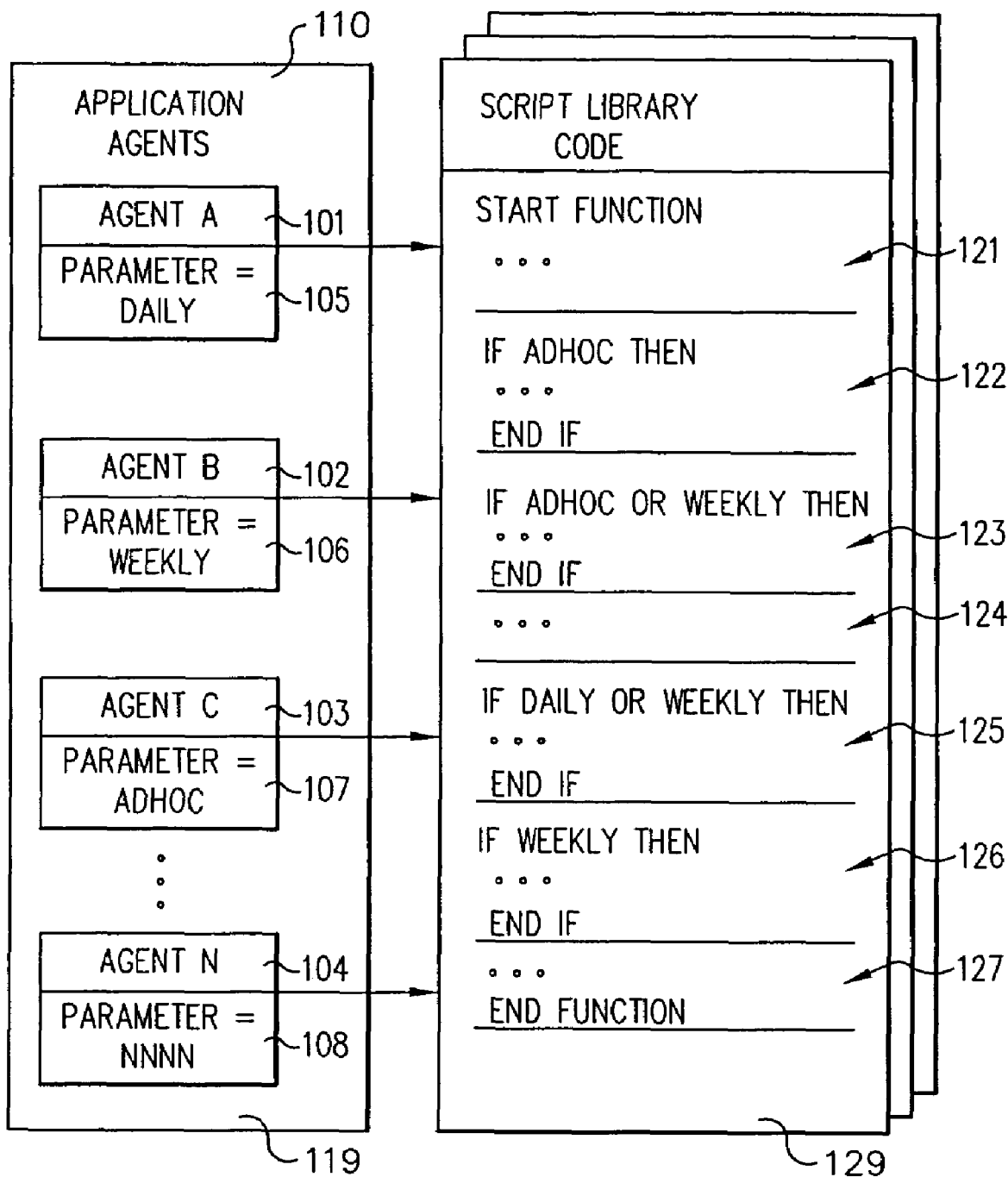
FIG. 2 is a diagrammatic illustration of the primary database application 110 and script library functions 129 of the system of FIG. 1.

Referring to FIG. 2, database, or primary application, 110 includes a plurality of agents 119, shown here as agents 101-104 having associated therewith parameters 105-108, respectively. These agents issue calls 113 to script library 120 which are received in functions and procedures 129, which include IF/THEN tests to decode parameters 105-108 and control the scope of processing of code fragments 121-127. In this manner, script library code procedure 129 includes common code which is activated based on schedules defined by parameters 105-108.

Referring to FIG. 3, an example of an agent 119 is set forth. Declarations 140, including 142, 144, 146, comprise a data type X1 RECORD, including variables MODE, VIEW, and COST, for defining parameters Y1, Y2, Y3—these representing parameters used in the procedures of the invention. Code segment 148 is any set of code. Code 150-162, in this exemplary agent 119, processes documents from collection DOC M1, which is set in statement 150 to M1WORK, and the first document selected. A WHILE loop, which includes code statements 152-159, includes a CALL UpdateAllInfo subroutine 156, a subroutine which is part of code 129, and which passes parameters 158, including X1 RECORD, the scope parameter, or data type, of the present invention. Code 157 sets the loop condition, and code 159 ends the WHILE segment.

Table 1 sets forth various exemplary agents 119, the tasks they perform, frequency, and scope parameter.

TABLE 1

AGENTS EXAMPLES

| Agent | Tasks | Frequency | Parameter |
| --- | --- | --- | --- |
| Initialize New Clients | For a new client record, initialize | Daily (short cycle execution) | DAILY |

TABLE 1-continued

AGENTS EXAMPLES

| Agent | Tasks | Frequency | Parameter |
|---|---|---|---|
| | employee directory information | | |
| Update Client Billing Information | For all existing clients, update project billing information | Nightly (long cycle execution) | NIGHTLY |
| Update Client Directory and Hardware Information | For all existing clients, update employee directory and hardware information | On demand, triggered by end-user | ADHOC |
| Update All Client Information | For all existing clients, update all directory, billing and hardware information | Weekly (long cycle execution) | WEEKLY |

Table 2 lists several examples of agents 109, showing those scheduled for different times, where "15 MIN" designates that the agent is run every 15 minutes, "D12AM" daily at 12:00 A.M., "WSAT2AM" weekly on Saturday at 2:00 A.M., and so forth.

TABLE 2

AGENTS 109 EXAMPLES

| Name/Command | Trigger |
|---|---|
| 01 15 MIN: EMM Super Agent Input | Scheduled |
| 02 ADHOC ONLY: EMM Reporting Load | Scheduled |
| 03 ADHOC ONLY: EMM Super Agent Information Update | Scheduled |
| 04 D12AM: EMM Super Agent Information Update | Scheduled |
| 05 D9PM: EMM Super Agent Information Update | Scheduled |
| 06 Set Instance As Active | Menu |
| 07 Set Instance as Inactive | Menu |
| 08 TEMP: Set Agent Value | Menu |
| 09 TEMP: Set Instance Status | Menu |
| 10 WSAT2AM: Backup EMM Instances weekly | Scheduled |
| 11 WSAT5PM: EMM Super Agent Information Update | Scheduled |
| 12 WSUN303AM: EMM Reporting Load | Scheduled |

Referring to Table 3, an example of an agent 109 is set forth. The agent designation "ADHOC AGNT; Weekly Agent Group" at line 03 is an example of an agent group that exists in multiple databases, and is invoked for each database of this type. The reference at line 20 to AGNT:On and Processing, is to an agent 119, which at line 20 is told to execute.

TABLE 3

EXAMPLE AGENT ADHOC ONLY: EMM Super Agent
Information Update (Agent): Initialize

```
00  ...
01  Set config_view=this_db.GetView("LookupAgentSettings")
02  Call config_view.Refresh
03  Set collection = config_view.GetAllDocumentsByKey
      ("ADHOC AGNT:Weekly Agent Group")
04  Set config_doc = collection.GetFirstDocument
05  'Loop through all active configuration documents
06  While Not(config_doc is Nothing)
```

TABLE 3-continued

EXAMPLE AGENT ADHOC ONLY: EMM Super Agent
Information Update (Agent): Initialize

```
07     'Get server and pathname from config
08     server-config_doc.ServerName(0)
09     If server = "" Then
10        pathFN=config_doc.LocalDatabasePathFN2(0)
11     Else
12        pathFN=config_doc.DatabasePathFN2(0)
13     End if
14     'Open the database and run the proper agent
15     Dim instance_db As New NotesDatabase("","")
16     Dim instance_agent As NotesAgent
17     Dim instance_agent2 as NotesAgent
18     Call instance_db.Open(server,pathFN)
19     Set instance_agent2 = instance_db.GetAgent ("AGNT:On
          Demand Processing")
20     Call instance_agent2.Run
23     Call intance_db.Close
24     Set config_doc = collection.GetNextDocument
          (config_doc.)
25     Wend
26  End Sub
```

Table 4 illustrates calls from D12AM: EMM Super Agent Information Update (Agent), an example of an agent 109 which is scheduled to run daily at 12:00 AM, to different agents 119 with various scopes and tasks that will in turn include calls to script procedures 129. "Dim" defines agent to agent, "Call" calls and runs the agent, and "Set", given that a defined variable is an agent, defines what agent it is. The calls at lines 15-20 to several agents 119 illustrates an agent group.

TABLE 4

EXAMPLE D12AM: EMM Super Agent Information
Update (Agent): Initialize

```
01   ...
02   'Open the database and run the proper Agent
03   Dim instance_db As New NotesDatabase("","")
04   Dim instance_agent1 As NotesAgent
05   Dim instance_agent2 As NotesAgent
06   Dim instance_agent3 As NotesAgent
07   Dim instance_agent4 As NotesAgent
08   Dim instance_agent5 As NotesAgent
09   Call instance_db.Open(server,pathFN)
10   Set instance_agent1 = instance_db.GetAgent
         ("AGNT:Update Billing Info - Nightly")
11   Set instance_agent2 = instance_db.GetAgent
         ("AGNT:Update Inventory Info - Nightly")
12   Set instance_agent3 = instance_db.GetAgent
         ("(AGNT:RefereshInventory)")
13   Set instance_agent4 = instance_db.GetAgent
         ("(AGNT:RefreshForecast)")
14   Set intance_agent5 = instance_db.GetAgent
         ("(AGNT:EarnedValueScheduled)")
15   Call instance_agent1.Run
16   Call instance_agent2.Run
17   Call instance_agent3.Run
18   Call instance_agent4.Run
19   Call instance_agent5.Run
20   Call instance_db.Close
21 ContinueWithNext:
22   Set config_doc =vcollection.GetNextDocument
         (config_doc)
23   Wend
```

Table 5 illustrates a list of agents 119 that will work on the database 110, including calls to procedures 129 under some defined scope. The agent 119 at line 02, for example, would have the format illustrated in FIG. 3.

TABLE 5

EXAMPLE D12AM: EMM Super Agent Information
Update (Agent): Initialize

| Name/Comment | Trigger |
|---|---|
| 01 ... | |
| 02 AGNT: Add New Printers - Weekly | Scheduled |
| 03 AGNT: EMMIT File Import | Scheduled |
| 04 AGNT: Import Documents From File | Scheduled |
| 05 AGNT: On Demand Processing | Scheduled |
| 06 AGNT: Process ISAM Preload Requests - Daily | Scheduled |
| 07 AGNT: Update Billing Info - Nightly | Scheduled |
| 08 AGNT: Update Directory and Adapter Info - Daily | Scheduled |
| 09 AGNT: Update Directory and Adapter Info - Weekly | Scheduled |
| 10 AGNT: Update Inventory Info - Nightly | Scheduled |
| 11 AGNT: Update Printer Info - Weekly | Scheduled |
| 12 AGNT: Weekly Agent Group | Scheduled |
| 13 (AGNT: Administrative Use) | Manual/Hidden |
| 14 (AGNT: ApproveMismatch) | Manual/Hidden |
| 15 (AGNT: ClearAddNoteCreated) | Manual/Hidden |
| 16 (AGNT: ClearPreviousLocation) | Manual/Hidden |
| 17 ... | |

Referring to FIG. 3, an exemplary portion of agent 119 code is shown. Declarations 140 declare in lines 142, 144, and 146 various parameters defining X1RECORD. The first of these parameters, at line 142, defines the mode, or scope "Y1".

Following further declarations and other processing 148, agent 119 prepares in steps 150, 152, and 154 to issue the call of step 156 to script library 120 function 129 "UpdateAllInfo", passing parameters 158, including parameter 160 "X1RECORD", which includes the declarations of lines 142, 144, and 146. The first variable of X1RECORD 160 is Mode="Y1" (for example, DAILY, ADHOC, or WEEKLY), and this will be used by if/then/else procedures 129 to determine which routines 162 are to be executed by various functions procedures 129.

Table 6 illustrates the code of an agent 119 about to invoke a routine 129 in the script library 120, illustrating procedure of the invention for passing parameters defining the scope of subroutines in procedures 129, including which documents in database 110 are to be processed. Table 6 is a coded example of the procedure 119 illustrated in FIG. 3.

In Table 6, line 02 illustrates how there is passed to the script library the definition of the scope for this agent. VN_EMMrecord corresponds to X1 Record of FIG. 3, and ="NIGHTLY" corresponds to Y1, the frequency parameter. Lines 2-14 are similar in function to lines 142, 144, 146 of FIG. 3. Line 19 is similar to code step 150 of FIG. 3, line 21 to step 154, and line 22 to step 156. Line 22 illustrates a large agent 129, which is segmented in the diagram of FIG. 2 into sections, or code fragments, 121-127, which are executed based on the scope definition of Table 6, line 2 (that is, for this example, nightly). In Table 6, line 22, the call to VN_EMMRecord brings in its variable list the variables defined in lines 02-14, the first of which (line 02) is the mode parameter which defines the scope (in this case, "NIGHTLY").

Referring to FIG. 2, application 110 agents 109 (that is, agents 101, 102, 103, and 104) call script library 129, including code fragments 121-127, passing respective meters 105-108 for controlling which script 121-127 routines to execute. Start function 121 is followed by several IF/THEN routines 122-126, with routine 122 executed responsive to receiving from agent 103 ADHOC parameter 107, routine 123 responsive to receiving from an ADHOC parameter from agent C or a WEEKLY parameter 106 from agent 102, routine 125 responsive to receiving a DAILY parameter 105 agent 101 or WEEKLY parameter 106 from agent 102, and routine 126 responsive to receiving a WEEKLY parameter 106 from agent 102. Script code fragments 121, 124, and 127 are executed for all calls to script library 129.

TABLE 6

EXAMPLE AGNT: Update Billing Info -
Nightly(Agent): Initialize

```
01 ...
02 VN_EMMRecord.Mode = "NIGHTLY"
03 VN_EMMRecord.EMMLookupView = "VW_AdapterMapping"
04 VN_EMMRecord.EMMSupportedView =
     "VW_LookupSupportedAdapetersDriver"
05 VN_EMMRecord.EMMLaborDates = "VW_LookupLaborDates"
06 VN_EMMRecord.EMMCosts= "VW_LookupCosts"
07 VN_EMMRecord.BPView = VN_TempView
08 VN_EMMRecord.BPView2 = "LookupTieLineLastName"
09 VN_EMMRecord.CableCost =
     DOC_EMMconfig.FN_PatchCableCost(0)
10 VN_EMMRecord.StandardPRITCost=
     DOC_EMMconfig.FN_StandardPRITCost(0)
11 VN_EMMRecord.PriorMigrationPRITCost =
     DOC_EMMconfig.FN_PriorMigrationPRITCost(0)
12 VN_EMMRecord.CostChangeClipLevel =
     DOC_EMMconfig.FN_CostChangeClipLevel(0)
13 VN_EMMRecord.HWDistributionCharge =
     DOC_EMMconfig.FN_HWDistributionCharge(0)
14 VN_EMMRecord.ABEEnabled =
     DOC_EMMconfig.FN_ABEEnabled(0)
15 If Ucase(DOC_EMMconfig.FN_ABEEnabled(0) = "YES" Then
     VN_EMMRecord.ABECharge =
     DOC_EMMconfig.FN_ABECharge(0)
16 Else
17   VN_EMMRecord.ABECharge = 0
18 End If
19 Set DOC_EMM = VW_EMMwork.GetFirstDocument
20 While Not(DOC_EMM Is Nothing)
21   Set
     VN_tempdoc=VW_EMMwork.GetNextDocument(DOC_EMM)
22 Call UpdateAllInfo(DB_EMM, DB_BP, DOC_EMM,
     VN_EMMRecord, VN_Costs,VN_LaborDates)
23 DOC_EMM.FN_Mapped = "Yes"
24 Call DOC_EMM.Save(True,False,True)
25 ...
```

Table 7 illustrates the start of a script library 120 subroutine 129 UpdateAllInfo called from line 22 of Table 6. It is an example of code segment 121. Lines 15-19 illustrate getting views of names out of VN_EMMRecord from database 110.

TABLE 7

EXAMPLE LSL_UpdateAllInfo (Script Library):
UpdateAllInfo

```
01 Sub UpdateAllInfo(DB_EMM As NotesDatabase,
     DB_BP As NotesDatabase, DOC_EMM As NotesDocument,
     VN_EMMRecord As EMMR ...
   '------------
02 ' Subroutine used to clean up the code in the
   ' EMM agents.
03 ' Adhoc, Daily, and Weekly updates call this
   ' subroutine.
   '------------
04 ' Initialization and Declaration
05 Dim DOC_BP As NotesDocument
06 Dim DOC-project as NotesDocument
07 Dim DOC_mapping as NotesDocument
08 Dim DOC_supported as NotesDocument
09 Dim vn_mappingdon As String
10 Dim vn_temp1 As NotesItem
11 Dim vn_temp2 As NotesItem
12 Dim Vn_entry as NotesViewEntry
13 Dim VN_EthernetDate As Variant
```

TABLE 7-continued

EXAMPLE LSL_UpdateAllInfo (Script Library): UpdateAllInfo

```
14   ' Run the update code
15   Set VW_EMMlockup = DB_EMM.GetView
        (VN_EMMRecord.EMMLookupView)
16   Set VW_EMMSupported = DB_EMM.GetView
        (VN_EMM.GetView(VN_EMMRecord.EMMSupportedView)
17   Set VW_EMMCosts = DB_EMM.GetView
        (VN_EMMRecord.EMMCosts)
18   Set VW_EMMLaborDates = DB_EMM.GetView
        (VN_EMMRecord.EMMLaborDates)
19   Set VW_project = DB_EMM.GetView
        (VN_EMMRecord.EMMProjectView)
20   Set VW_BP = DB_BP.GetView(VN_EMMRecord.BPView)
21   Set VW2_BP = DB_BP.GetView(VN_EMMRecord.BPView2)
22   VN_Mode = Ucase(VN_EMMRecord.Mode)
23   vn_nonerequired = "No"
24   vn_mappingdone = "No"
```

Table 8 presents an example of script library code with scope applied. Line 11 corresponds to the IF statement in code segment 123 of FIG. 2. This code segment 129 is not run if the scope parameter is NIGHTLY or DAILY. Lines 12-24 represent executable code within segment 129.

TABLE 8

EXAMPLE: SCRIPT LIBRARY CODE WITH SCOPE APPLIED
LSL_UpdateAllInfo (Script Library): UpdateAllInfo

```
01   Set VW_EMMlookup = DB_EMM.GetView
        (VN_EMMRecord.EMMLookupView)
02   Set VW_EMMSupported = DB_EMM.GetView
        (VN_EMMRecord.EMMSupportedView)
03   Set VW_EMMCosts = DB_EMM.GetView
        (VN_EMMRecord.EMMCosts)
04   Set VW_EMMLaborDates = DB_EMM.GetView
        (VN_EMMRecord.EMMLaborDates)
05   Set VW_project = DB_EMM.GetView
        (VN_EMMRecord.EMMProjectView)
06   Set VW_BP = DB_BP.GetView(VN_EMMRecord.BPView)
07   Set VW2_BP = DB_BP.GetView(VN_EMMRecord.BPView2)
08   VN_Mode = Ucase(VN_EMMRecord.Mode)
09   vn_nonerequired = "No"
10   vn_mappingdone = "No"
11   If Ucase(VN_Mode) <> "NIGHTLY" And Ucase(VN_Mode)
        <> "DAILY" Then
12   'Update BluePages Info
13   VN_mykey$ =
     Left$(Trim(DOC_EMM.FN_OwnerSerialNumber(0)),6)
14   Set DOC_BP = VW_BP.GetDocumentByKey(VN_mykey$,True)
15   If Not (DOC_BP Is Nothing) Then
16        DOC_EMM.FN_BPEmpName = DOC_BP.Name(0)
17        DOC_EMM.FN_LastHRUpdate = Today
18        If DOC_BP.NotesID(0) = "" Then
19           DOC_EMM.FN_BPNotesAddress =
              DOC_BP.EMailAddress(0)
20        Else
21           DOC_EMM.FN_BPNotesAddress =
              DOC_BP.NotesID(0)
22        End If
23        Set VN_mytempname = New NotesName
              (DOC_EMM.FN_BPNotesAddress(0))
24        DOC_EMM.FN_BPNotesAddress =
              VN_mytempname.Abbreviated
25        DOC_EMM.FN_BPEmpName=DOC_BP.Name(0)
26 ...
```

ADVANTAGES OVER THE PRIOR ART

A system, method and computer program product is provided for controlling the scope of execution of code fragments in a script library.

ALTERNATIVE EMBODIMENTS

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-readable medium providing program code for use by or in connection with a computer or any instruction execution system. For the purposes of this description, a computer-readable medium can be any apparatus that can contain or store; the program for use by or in connection with the instruction execution, system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Accordingly, the scope of protection of this invention is limited only by the following claims and their equivalents.

We claim:

1. A computer-implemented method for controlling the scope of code in a script library, comprising:

a specific programmed processor creating, in a script library, a plurality of common blocks of code including code fragments defined by IF/THEN statements;

packaging collections of parameters, each of said collections of parameters forming a data type including a scope parameter, wherein said scope parameter defines how often a script from said script library is scheduled for execution, and wherein the IF/THEN statements decode the scope parameter and control a scope of processing of scripts from said script library;

providing, in a database application, a plurality of first agents, each said first agent packaging an instantiation of a data type including said scope parameter, wherein each of the plurality of first agents is exclusively associated with a particular type of script in the script library that is to be executed according to a time schedule set by said scope parameter;

providing in a secondary application a plurality of second agents for scheduling execution of said first agents, wherein each of said plurality of second agents issues calls to multiple said first agents in said database application, wherein said calls are to scripts in said script library;

responsive to a second agent scheduling execution of at least one first agent, executing said first agent to issue a call including said scope parameter to said script library; and executing said code fragments and script from said script library responsive to said scope parameters.

2. The computer-implemented method of claim 1, wherein one of the first agents uniquely causes new printers to be added to a system on a weekly basis.

3. The computer-implemented method of claim 1, further comprising:

providing in said script library a plurality of functions and procedures, each said function and procedure including a plurality of said code fragments; and each said first agent issuing at least one call to a selected one of said functions and procedures.

4. The computer-implemented of claim 3, further comprising:

providing in each said function and procedure a start function, an end function, and a plurality of said code fragments; and executing each said function and procedure sequentially to select and execute said code fragments responsive to said scope parameters.

5. The computer-implemented of claim 4, further comprising:

providing in each said first agent a plurality of declarations defining said data type and including said scope parameter and at least one other parameter;

issuing a call to at least one of said functions and procedures for each of a plurality of entries in said database; and selecting for execution code fragments within said functions and procedures responsive to said scope parameter and executing only selected code fragments with respect to said at least one other parameter.

6. The computer-implemented method of claim 1, wherein one of the first agents uniquely causes billing information in a system to be updated nightly.

7. The computer-implemented method of claim 1, wherein one of the first agents uniquely causes inventory information in a system to be updated nightly.

8. A computer program product for controlling the scope of code in a script library, said computer program product comprising:

a tangible computer readable storage medium;

first program instructions for creating in said script library a plurality of common blocks of code including code fragments defined by IF/THEN statements;

second program instructions for packaging collections of parameters, each of said collections of parameters forming a data type including a scope parameter, wherein said scope parameter defines how often a script from said script library is scheduled for execution, and wherein the IF/THEN statements decode the scope parameter and control a scope of processing of scripts from said script library;

third program instructions for providing, in a database application, a plurality of first agents, each said first agent packaging an instantiation of a data type including said scope parameter, wherein each of the plurality of first agents is exclusively associated with a particular type of script in the script library that is to be executed according to a time schedule set by said scope parameter;

fourth program instructions for providing in a secondary application a plurality of second agents for scheduling execution of said first agents, wherein each of said plurality of second agents issues calls to multiple said first agents in said database application, wherein said calls are to scripts in said script library;

fifth program instructions for, responsive to a second agent scheduling execution of at least one first agent, executing said first agent to issue a call including said scope parameter to said script library; and sixth program instructions for executing said code fragments responsive to said scope parameters; and wherein said first, second, third, fourth, fifth, and sixth program instructions are recorded on said tangible computer readable storage medium.

9. The computer program product of claim 8, wherein one of the first agents uniquely causes new printers to be added to a system on a weekly basis.

10. The computer program product of claim 9, farther comprising:

seventh program instructions for providing in said script library a plurality of functions and procedures, wherein each said function and procedure includes a plurality of said code fragments, wherein each said first agent issues at least one call to a selected one of said functions and procedures; and wherein said seventh program instructions are recorded on said tangible computer readable storage medium.

11. The computer program product of claim 10, further comprising:

eighth program instructions for providing in each said function and procedure a start function, an end function, and a plurality of said code fragments;

ninth program instructions for executing each said function and procedure sequentially to select and execute said code fragments responsive to said scope parameters; and wherein said eighth and ninth program instructions are recorded on said tangible computer readable storage medium.

12. The computer program product of claim 11, further comprising:

tenth program instructions for providing in each said first agent a plurality of declarations defining said data type and including said scope parameter and at least one other parameter;

eleventh program instructions for issuing a call to at least one of said functions and procedures for each of a plurality of entries in said database;

twelfth program instructions for selecting for execution code fragments within said functions and procedures responsive to said scope parameter and executing only selected code fragments with respect to said at least one other parameter; and wherein said tenth, eleventh and twelfth program instructions are recorded on said tangible computer readable storage medium.

13. The computer program product of claim 8, wherein one of the first agents uniquely causes billing information in a system to be updated nightly.

14. The computer program product of claim 8, wherein one of the first agents uniquely causes inventory information in a system to be updated nightly.

15. A system for controlling the scope of code in a script library, said system comprising:
- a processor, a computer readable memory, and a computer readable storage media;
- first program instructions for creating in said script library a plurality of common blocks of code including code fragments defined by IF/THEN statements;
- second program instructions for packaging collections of parameters, each of said collections of parameters forming a data type including a scope parameter, wherein said scope parameter defines how often a script from said script library is scheduled for execution, and wherein the IF/THEN statements decode the scope parameter and control a scope of processing of scripts from said script library;
- third program instructions for providing, in a database application, a plurality of first agents, each said first agent packaging an instantiation of a data type including said scope parameter, wherein each of the plurality of first agents is exclusively associated with a particular type of script in the script library that is to be executed according to a time schedule set by said scope parameter;
- fourth program instructions for providing in a secondary application a plurality of second agents for scheduling execution of said first agents, wherein each of said plurality of second agents issues calls to multiple said first agents in said database application, wherein said calls are to scripts in said script library;
- fifth program instructions for, responsive to a second agent scheduling execution of at least one first agent, executing said first agent to issue a call including said scope parameter to said script library; and
- sixth program instructions for executing said code fragments responsive to said scope parameters; and wherein said first, second, third, fourth, fifth, and sixth program instructions are stored on said computer readable storage media for execution by said processor via said computer readable memory.

16. The system of claim 15, further comprising:
- seventh program instructions for providing in said script library a plurality of functions and procedures, wherein each said function and procedure includes a plurality of said code fragments, and wherein each said first agent issues at least one call to a selected one of said functions and procedures, and wherein said seventh program instructions are recorded on said computer readable storage media.

17. The system of claim 16, further comprising:
- eighth program instructions for providing in each said function and procedure a start function, an end function, and a plurality of said code fragments;
- ninth program instructions for executing each said function and procedure sequentially to select and execute said code fragments responsive to said scope parameters; and
- wherein said eighth and ninth program instructions are recorded on said computer readable storage media.

18. The system of claim 17, further comprising:
- tenth program instructions for providing in each said first agent a plurality of declarations defining said data type and including said scope parameter and at least one other parameter;
- eleventh program instructions for issuing a call to at least one of said functions and procedures for each of a plurality of entries in said database;
- twelfth program instructions for selecting for execution code fragments within said functions and procedures responsive to said scope parameter and executing only selected code fragments with respect to said at least one other parameter; and
- wherein said tenth, eleventh and twelfth program instructions are recorded on said computer readable storage media.

19. The system of claim 15, wherein one of the first agents uniquely causes billing information in a system to be updated nightly.

* * * * *